United States Patent Office 3,059,180
Patented Oct. 16, 1962

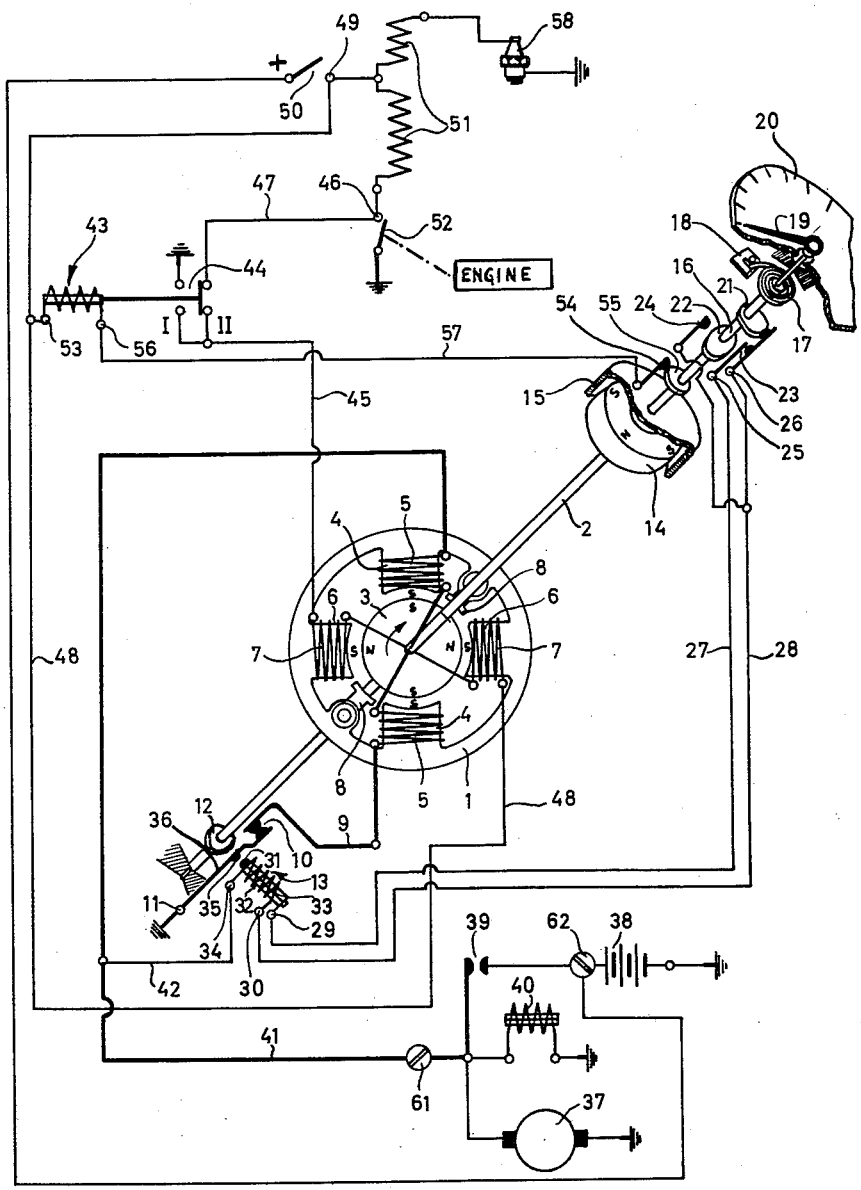

3,059,180
ROTARY SPEED INDICATOR
Kurt Gentner, Stuttgart-Bad Cannstatt, Germany, assignor to Moto Meter Hermann Schlaich, Stuttgart, Germany
Filed Sept. 23, 1959, Ser. No. 841,795
Claims priority, application Germany Sept. 26, 1958
6 Claims. (Cl. 324—70)

The present invention refers to rotary speed indicators for internal combustion engines equipped with an electrical ignition system producing periodical pulses in rhythm with the revolutions of the engine. Instruments of this type are usually enclosed by a suitable housing and are provided with a dial on which a pointer mounted on an indicator shaft indicates the rotary speed measured by the instrument.

Although internal combustion engines are mostly used in motor cars or similar vehicles which are conventionally equipped with tachometers indicating the speed of the vehicle, it is nevertheless of substantial interest in many cases to obtain additionally an indication of the actual rotary speed of the engine.

In view of the conventional construction of internal combustion engines it is quite difficult to mount directly on such an engine a rotary speed indicator because none of the shafts driven by and forming a part of the engine are directly available for attaching an indicator shaft thereto.

Therefore, it has been proposed to derive an indication of the rotary speed of the engine from an observation of the sequence of ignition pulses furnished by the ignition system of the engine. However, in synchronous motors operated by the ignition pulses are used a difficulty has arisen in conventional equipment because the synchronous motor has first to be started by special starting means and accelerated up to a speed in which the motor would be in synchronism with the ignition pulses. A further drawback of such an arrangement consists in the fact that every time when the synchronous motor, e.g., upon shifting the gears in the driving mechanism operated by the engine, loses its synchronism with the rotation of the engine, the synchronous motor must be started again in order to be accelerated or otherwise synchronized with the rotation of the engine. Since the respective starter devices for the synchronous motor would have to be operated by hand, this constitutes a great inconvenience for the driver of the vehicle or operator of the engine so that rotary speed indicators of this type cannot be considered as satisfactory for all practical purposes.

It is therefore a main object of this invention to provide for a rotary speed indicator for the purpose set forth and of a construction which overcomes the above mentioned difficulties.

It is a second object of this invention to provide for a speed indicator of the type set forth which is comparatively simple in structure but nevertheless entirely reliable and accurate for the purposes in question.

With above objects in view a rotary speed indicator for internal combustion engines equipped with an electrical ignition system producing periodical pulses in rhythm with the revolutions of the engine comprises, according to the invention, indicator means including an indicator drive shaft means; motor means operatively connected with said drive shaft means and including a permanent magnet rotor mounted on said drive shaft means, a first set of stator means for imparting upon energization thereof to said rotor a starting torque and for accelerating the same up to at least a predetermined rotary speed, and a second set of stator means for driving upon energization thereof said drive shaft means in synchronism with the engine after said predetermined speed has been reached; first circuit means connecting said first set of stator means to a source of direct current; second circuit means connecting said second set of stator means with the ignition system of the engine for applying the ignition pulses to said second set of stator means so as to cause rotation of said rotor in rhythm with the revolutions of the engine; and control means connected in said circuit means and operable by said indicator means for disconnecting said first set of stator means from said source of direct current and for connecting said second set of stator means with said ignition system when said predetermined speed has been reached, while disconnecting said second set of stator means from said ignition system and re-connecting said first set of stator means with said source when the speed of said drive shaft means decrease to a predetermined minimum.

In another aspect of this invention, a rotary speed indicator for internal combustion engines equipped with an electrical ignition system producing periodical pulses in rhythm with the revolutions of the engine comprises indicator means including an indicator drive shaft; motor means operatively connected with said drive shaft means and including a permanent magnet rotor of predetermined mass and polarity mounted on said drive shaft means, a set of stator means energizable by application of direct current to assume a predetermined magnetic polarity cooperating with the polarity of said rotor for causing said rotor to turn from a first position toward a second position in which the magnetically produced torque would subside; circuit means connecting said set of stator means with a source of direct current and including switch means operable by said drive shaft means, depending upon the rotation thereof, between a closed position and an open position in such a manner that said stator means are energized whenever said rotor is in said first position but de-energized before said rotor reaches said second position whereby said rotor is enabled to continue its rotation due to the moment of inertia of its predetermined mass after said switch means have been moved to open position, and to receive a new turning impulse when said switch is again moved to closed position; and means operatively connected between the ignition system and said motor means for limiting the rotary speed of said motor means to synchronism with the engine by application of said ignition pulses to said motor means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing which illustrates diagrammatically a preferred embodiment of the invention.

The most important component of the rotary speed indicator according to the invention, as illustrated in the drawing, is a special type of motor comprising a substantially annular stator structure 1 and a rotor 3 mounted on an indicator drive shaft 2. The rotor 3 is a four-pole permanent drum magnet. The stator structure 1 comprises a pair of stator poles 4 diametrically opposed to each other and each provided with a rotor winding 5. The windings 5 are connected with each other in series. The so far described portion of the motor constitutes the starter motor of the device. The stator structure 1 further comprises a second pair of stator poles 6 positioned at 90° with respect to the stator poles 5 and opposite to each other. Each of the poles 6 is provided with a winding 7; these windings likewise connected in series with each other. For reasons explained further below the windings 7 have a greater number of ampere turns than the windings 5. In addition, the stator structure 1 comprises a pair of auxiliary magnet poles 8 located in opposition to each other between the poles 5 and 6. The permanent polarity of the rotor 3 is indicated by the letters S and N. Similarly the predetermined polarity of the poles 4 and 6, respectively, obtained by energization thereof by a direct current, are indicated by the letter S.

One terminal of the series connected set of windings 5 is connected by a connecting line 9 with an interrupter switch 10 having one stationary contact and a movable contact carried by a movable arm 36 tending to keep the contacts of the switch 10 normally closed. The end of the arm 36 is grounded at 11. The switch 10 is operable, as will be explained further below, by a cam member 12 mounted on the shaft 2 and capable of periodically moving the arm 36 so as to separate the contacts of the switch 10. In addition there is provided an electromagnet 13 likewise capable of moving the arm 36 into opening position of the switch 10.

Mounted on the outer end of the indicator drive shaft 2 is a permanent magnet disc 14. An indicator shaft 16 is mounted in alignment with the drive shaft 2 and carries at its outer end the pointer 19 cooperating with the dial 20. The other end of the indicator shaft 16 is provided with a bell-shaped member 15 which is adapted to constitute together with the magnet disc 14 an eddy-current coupling between the shafts 2 and 16. As is well known in the art, rotation of the shaft 2 and of the disc magnet 14 will cause through the eddy-current coupling the shaft 16 to turn against the action of a coil spring 17 mounted between the shaft 16 and a stationary support 18. The spring 17 serves to return the pointer 19 to normal or zero position when no torque is transmitted from shaft 2 to shaft 16.

The indicator shaft 16 further carries three different cams. The cam 21 is made of insulating material and is adapted to operate, as will be explained below, a switch device 23. The cam 22 is angularly offset against the position of the cam 21 and is adapted to operate, as will be explained, the stationary contact 24. Finally the cam 55 is mounted in still another angular position and is adapted to cooperate with the stationary contact 54. Although this is not shown in the drawing, it has to be understood that the indicator shaft 16 is grounded so that the cams 22 and 55 being made of conductive material also constitute a connection to ground. It may be added in this connection that the previously mentioned cam 12 on the drive shaft 2 is also made of insulating material.

The above mentioned electromagnet 13 is provided with a winding 33 having terminals 30 and 34. In addition, the magnet core 32 is itself a circuit component because it is conductively connected with the terminal 34 and a terminal 29. One end of the core 32 is equipped with an electrical contact 31 conductively connected with the core 32. The two terminals 25, 26 of the switch 23 are connected respectively by the connecting lines 27 and 28 with the terminals 29 and 30, respectively. The terminal 34 of the magnet 13 is connected by a line 42 with a junction point in the direct current supply line 41 described further below. The arm 36 of the switch 10 is further equipped with a contact point 35 opposite the above mentioned contact point 31 of the magnet core 32 so that by moving the arm 36 toward the magnet 13 a connection between the contacts 31 and 35 can be established while at the same time the contacts of the switch 10 are separated from each other.

During part of the operation of the device according to the invention direct current is applied to the motor. Such a source of direct current should have its negative pole grounded while its positive pole should be connected with the terminal 61 to which the above mentioned supply line 41 is attached. In the usual installation of a motor driven vehicle a battery 38 would constitute a permanent source of direct current. Such a battery 38 is in this case charged by a generator 37 driven by the engine. One terminal of the generator 37 is grounded, the other one is connected as shown in such a manner that positive potential can be applied via the switch 39, when closed, and terminal 62 to the positive pole of the battery 38. In the customary manner an electromagnet 40 controls the switch 39 in such a manner that when the generator output reaches a predetermined value the switch 39 is closed and the energy from the generator is applied to the battery 38. However, when the generator output is less than the predetermined value the switch 39 opens so that the battery 38 is protected against being discharged across the generator 37. From the terminal 62 a connecting line leads to the ignition switch 50 which therefore constitutes a positive terminal as well as the terminals 61 and 62.

The above mentioned terminal 61 is connected by the supply line 41 with the second terminal of the series connected windings 5 of the starter motor portion of the motor device.

The current supply to the windings 7 of the synchronous motor portion of the motor device is controlled by a relay 43 which is equipped with an armature normally urged by means not shown in one direction so as to assume, when the coil of the relay 43 is not energized the position II in which one set of contacts is conductively connected, and to assume when the relay 43 is energized a position I in which another set of contacts is conductively connected, one of the latter contacts being connected to ground. One terminal 53 of the relay 43 is connected with the line 48 which connects the stationary contact 49 of the ignition switch 50 with the one end of the series connected windings 7. The other terminal 56 of the relay 43 is connected by a line 57 with the stationary contact 54 mentioned above. The opposite end of the series connected winding 7 is connected by a line 45 with the not grounded contact of the contact pair I and with one of the stationary contacts of the contact pair II. The other stationary contact of the last mentioned pair of contacts is connected by a line 47 with a terminal 46 forming part of the interrupter contact 52 operated by the engine in the well known manner. The terminal 46 is connected with one end of the ignition coil 51 which comprises two portions, the junction point between these portions being connected to the already mentioned contact 49. The opposite end of the ignition coil 51 is connected through the spark plug 58 to ground. It can be seen, therefore, that in one position of the armature of relay 43, i.e., when the relay 43 is energized, the one end of the series connected windings 7 is connected with ground. However, when the relay 43 is not energized, the windings 7 are connected through the contact pair II and line 47 with the ignition system of the engine. It is well known that the periodical operation of the interrupter contact 52 causes in the ignition coil the generation of ignition pulses which are necessarily in rhythm with the revolutions of the engine.

It should be noted that the stationary contact 24 is connected with a junction point within the connecting line 28.

The operation of the above described device is as follows:

When the ignition switch 50 is closed and the engine is started the pointer 19 and the indicator shaft 16 are in their zero positions. In this position of the shaft 16 the grounded cam 55 is in the position shown in the drawing, i.e., in contact with the stationary contact 54 whereby direct current is applied to the coil of the relay 43. Hereby the armature of relay 43 is pulled into position I whereby direct current is applied to the synchronous motor winding 7 because these windings are connected between ground and the positive terminal 62 via line 45, line 48, closed ignition switch 50 and line 48'. By this application of direct current to the windings 7 the rotor 3 is caused to assume a predetermined fixed starting position as shown in the drawing in which the north poles of the rotor 3 are opposite the south poles of the stator portions 6.

Since evidently in this manner a definite and predetermined starting position of the rotor 3 with respect to the stator arrangement 1 is secured it can be expected that, before at the start of operations the pointer 19 and the indicator shaft 16 move out of their zero positions so as to disengage cam 55 from contact 54 whereby the relay 43 is deenergized, also the drive shaft 2 is in a predetermined starting position in which the cam 12 is in a position in which it does not prevent the contacts of switch 10 from being in the closed position shown in the drawing. Therefore, under these conditions and at this moment, one terminal of the starter windings 5 is connected via contact 10 and terminal 11 with ground, while the other terminal of the starter windings 5 is connected by line 41 to positive potential. Consequently, while the windings 7 are disconnected from ground by the return of armature of relay 43 to its normal position I, the starter windings 5 are energized. The identical polarity of the poles of the stator members 4 and of the opposed portions of the rotor 3 now results in a repulsion effect whereby the rotor is caused to turn in the direction of the arrow. Evidently the direction of turn would not be predetermined without the effect of the auxiliary poles 8. The magnetization of the stator members 4 automatically causes the auxiliary poles 8 to assume opposite magnetic polarity which eliminates the ambiguity of the repulsion effect between the stator members 4 and the corresponding poles of the rotor 3. The auxiliary poles 8 exert an auxiliary magnetic force so as to determine the direction of rotation of the rotor 3 upon energization of the windings 5.

As the rotor 3 turns the torque effect on the rotor 3 by the magnetism of the stator member 4 will diminish and subside. After a quarter turn the rotor would be held in fixed position by the poles N of the rotor being opposite the south poles of the members 4. However, in order to provide for continuous rotation of the rotor 3 during the period of energization of the starter windings 5, the interrupter cam 12 on shaft 2 is provided. Cam 12 is so positioned on the shaft 2 that it will cause the contacts of the switch 10 to separate before the repulsion effect derived from the stator members 4 subsides. After the resulting interruption of the flow of direct current through the windings 5 the rotor 3 having a sufficient predetermined mass will continue its started rotation due to its inertia and as soon as the cam 12 permits the switch 10 to move again into closed position a new impulse of direct current will be permitted to flow to the starter windings 5. This performance repeats continuously while the speed of the rotor 3 gradually increases. Experiments have shown that this increase of speed develops very rapidly.

During the increased speed of rotation of the rotor 3 and the drive shaft 2 with the magnet 14 attached to its end, the indicator shaft is caused increasingly to move from its zero position into indicating positions.

Means are provided to prevent the rotor 3 and drive shaft 2 from assuming a speed which is higher than that at which the shaft 2 would revolve in synchronism with the revolutions of the engine i.e. in rhythm with the ignition impulses furnished by the ignition system. This performance is obtained by means of the cams 21 and 22 on the shaft 16. As soon as the rotary speed of the rotor 3, which is actually indicated by the turning movement of the shaft 16 and the pointer 19, exceeds a predetermined upper limit the starter windings 5 are disconnected from the source of electrical energy through the action of the electromagnet 13. Depending upon the angular setting of the cam 22, e.g. at 2000 r.p.m., the grounded cam 22 will contact the stationary contact 24. Hereby the connecting line 28 is being connected to ground so that a circuit through the winding 33 is established from ground through line 28, terminal 30, terminal 34, lines 42 and 41 to the positive terminal 61. The energization of the electromagnet 13 results in attraction of the arm 36 with the following effects: The switch 10 is opened so that the windings 5 are disconnected from their source of supply; second, the contact 35 is brought into connection with contact 31 so that a holding current for the winding 33 of the electromagnet 13 is established from the grounded terminal 11, through the core 32, terminal 29, line 27, closed contacts 23, line 28 and terminal 34, lines 42 and 41 to positive terminal 61. Consequently, the open position of the switch 10 will be maintained even if due to variations in speed the cam 22 is disengaged from the stationary contact 24. However, if the speed should decrease and drop to a predetermined lower limit, then the insulated cam 21 will engage one arm of the switch 23 so as to separate the contacts of this switch. At this moment the holding current for the winding 33 is interrupted, the arm 36 will move back into normal position under the influence of return means not shown and close the contacts of the switch 10. Now the current supply for the windings 5 is reestablished and the cycle would repeat as described above. The windings 5 will again accelerate the rotor 3.

It can be seen that after the above described moment when through opening of the switch 10 the starter portion of the motor device has been disconnected, i.e. when a predetermined upper limit speed has been reached, the rotor 3 will be driven exclusively by the ignition pulses derived from the ignition system through line 47, closed contact pair II, line 45, line 48, closed ignition switch 50, and line 48′. This means that the synchronous motor portion comprised by the members 6 and 7 causes the rotor 3 and shaft 2 to rotate in synchronism with the engine i.e. in rhythm with the ignition pulses. Should for any reason the rotation of the rotor 3 during the operation of the engine drop out of synchronism with the engine, the insulated cam 21 will assume at correspondingly reduced rotary speed of the shaft 2 such a position that the contacts of the switch 23 are separated whereby, as described above, the electromagnet 13 is deenergized and the switch 10 is closed and may be further operated by the cam 12 in the manner set forth for rendering the starter portion 4, 5 of the motor device operative. This results in a renewed acceleration of the rotor 3 up to a speed at which it is synchronous with the sequence of ignition pulses.

The cam 21 is so shaped that the switch 23 remains in closed position at all speeds above a predetermined lower limit. Only when the speed drops below this lower limit the switch 23 is opened whereby, as described, the starter portion 4, 5 is again activated. However, the grounded cam 22 has only to close the associated circuit for a brief moment whenever a predetermined upper speed limit is reached. Even a temporary contact between the cam 22 and the stationary contact 24 is sufficient for energizing the electromagnet 13 which then is held in energized position independently of changing positions of the cam 22. It will be understood that the device according to the invention is a self-starting device and requires no manual controls during operation. This is due to the fact that the motor means described above constitute an extremely simple and efficient combination of an asynchronous starter motor with a synchronous motor. The asynchronous starter motor acts as an automatic starter both at the beginning of the operation and whenever for any reason the synchronous drive is disturbed, and the starter motor is disconnected as soon as a certain speed is reached. Initially the rotor is accelerated by the starter motor portion until by the utilization of the ignition pulses a certain synchronous speed is reached whereafter a further speed increase of the motor, otherwise caused by the action of the starter motor, is prevented by the stronger effect of the synchronizing impulses, and above a certain upper speed limit the starter motor is completely disconnected. When, on the other hand, the motor speed drops below a certain lower speed limit, then the starter motor is automatically switched on again.

All the components of the rotary speed indicator described above can be easily accommodated by a housing of comparatively small dimensions. In this manner a rotary speed indicator is devised which can be mounted for instance on the instrument panel of a motor vehicle in the same manner as all other conventional panel instruments.

It will be understood that each of the elements described above, or two or more together, may also find a useful application in other types of rotary speed indicator differing from the types described above.

While the invention has been illustrated and described as embodied in rotary speed indicator for an internal combustion engine equipped with an electrical ignition system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various application without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a rotary speed indicator for internal combustion engines equipped with an electrical ignition system producing periodical pulses in rhythm with the revolutions of the engine, in combination, indicator means including an indicator drive shaft means; first motor means operatively connected with said drive shaft means and including a permanent magnet rotor of predetermined mass and polarity mounted on said drive shaft means, a set of stator means energizable by application of direct current to assume a predetermined magnetic polarity cooperating with the polarity of said rotor for producing a torque sufficient for causing said rotor to turn from a first position toward a second position in which the magnetically produced torque would subside; circuit means connecting said set of stator means with a source of direct current and including switch means operable by said drive shaft means, depending upon the rotation thereof between a closed position and an open position in such a manner that said stator means are energized whenever said rotor is in said first position but de-energized before said rotor reaches said second position whereby said rotor is enabled to continue its rotation due to the moment of inertia of its predetermined mass after said switch means have been moved to open position and to receive a new turning impulse when said switch is again moved to closed position; and second motor means conductively connected with the ignition system and mechanically connected with said drive shaft means for limiting the rotary speed of said drive shaft means to synchronism with the ignition pulses of the engine by application of said ignition pulses to said second motor means.

2. In a rotary speed indicator for internal combustion engines equipped with an electrical ignition system producing periodical pulses in rhythm with the revolutions of the engine, in combination, indicator means including an indicator drive shaft means; first motor means operatively connected with said drive shaft means and including a permanent magnet rotor mounted on said drive shaft means, a first set of stator means for imparting upon energization thereof to said rotor a starting torque and for accelerating the same up to at least a predetermined rotary speed, and second motor means comprising a second set of stator means cooperating with said permanent magnet rotor for driving upon energization thereof said drive shaft means in synchronism with the engine after said predetermined speed has been reached; first circuit means connecting said first set of stator means to a source of direct current; second circuit means connecting said second set of stator means with the ignition system of the engine for applying the ignition pulses to said second set of stator means so as to cause rotation of said rotor in rhythm with the revolutions of the engine; and control means connected in said circuit means and operable by said indicator means for disconnecting said first set of stator means from said source of direct current and for connecting said second set of stator means with said ignition system when said predetermined speed has been reached, while disconnecting said second set of stator means from said ignition system and reconnecting said first set of stator means with said source when the speed of said drive shaft means decreases to a predetermined minimum.

3. In a rotary speed indicator for internal combustion engines equipped with an electrical ignition system producing periodical pulses in rhythm with the revolutions of the engine, in combination, indicator means including an indicator shaft turnable from a normal zero position to indicating positions respectively indicating various rotary speeds of the engine, an indicator drive shaft means, and eddy current coupling means operatively connecting said indicator shaft means with said indicator drive shaft means for transmitting a torque depending upon the rotary speed of said indicator drive shaft means from the latter to said indicator shaft means for moving the latter to said indicating positions; first motor means operatively connected with said drive shaft means and including a permanent magnet rotor mounted on said drive shaft means, a first set of stator means for imparting upon energization thereof to said rotor a starting torque and for accelerating the same up to at least a predetermined rotary speed, and second motor means comprising a second set of stator means cooperating with said permanent magnet rotor for driving upon energization thereof said drive shaft means in synchronism with the engine after said predetermined speed has been reached; first circuit means connecting said first set of stator means to a source of direct current; second circuit means connecting said second set of stator means with the ignition system of the engine for applying the ignition pulses to said second set of stator means so as to cause rotation of said rotor in rhythm with the revolutions of the engine; and control means connected in said circuit means and operable by said indicator means for disconnecting said first set of stator means from said source of direct current and for connecting said second set of stator means with said ignition system when said predetermined speed has been reached, while disconnecting said second set of stator means from said ignition system and reconnecting said first set of stator means with said source when the speed of said drive shaft means decreases to a predetermined minimum.

4. In a rotary speed indicator for internal combustion engines equipped with an electrical ignition system producing periodical pulses in rhythm with the revolutions of the engine, in combination, indicator means including an indicator shaft turnable from a normal zero position to indicating positions respectively indicating various rotary speeds of the engine, an indicator drive shaft means, and eddy current coupling means operatively connecting said indicator shaft means with said indicator drive shaft means for transmitting a torque depending upon the rotary speed of said indicator drive shaft means from the latter to said indicator shaft means for moving the latter to said indicating positions; first motor means operatively connected with said drive shaft means and including a permanent magnet rotor of predetermined mass and polarity mounted on said drive shaft means, a set of stator means energizable by application of direct current to assume a predetermined magnetic polarity cooperating with the polarity of said rotor for causing said rotor to turn from a first position toward a second position in which the magnetically produced torque would subside; circuit means connecting said set of stator means with a source of direct current and including switch means operable by said drive shaft means depending upon the rotation thereof, between a closed position and an open position in such a manner that said stator means are energized whenever said rotor is in said first position but de-energized before said rotor reaches said second position whereby said rotor is enabled to continue its rotation due to the moment of inertia of its predetermined mass after said switch means have been moved to open position and to receive a new turning impulse when said switch is again moved to closed position; and second motor means conductively connected with the ignition system and mechanically connected with said drive shaft means for limiting the rotary speed of said drive shaft means to synchronism with the ignition pulses of the engine by application of said ignition pulses to said second motor means.

5. In a rotary speed indicator for internal combustion engines equipped with an electrical ignition system producing periodical pulses in rhythm with the revolutions of the engine, in combination, indicator means including an indicator shaft turnable from a normal zero position to indicating positions respectively indicating various rotary speeds of the engine, an indicator drive shaft means, and eddy current coupling means operatively connecting said indicator shaft means with said indicator drive shaft means for transmitting a torque depending upon the rotary speed of said indicator drive shaft means from the latter to said indicator shaft means for moving the latter to said indicating positions; first motor means operatively connected with said drive shaft means and including a permanent magnet rotor of predetermined mass and polarity mounted on said drive shaft means, a first set of stator means energizable by application of direct current to assume a predetermined magnetic polarity cooperating with the polarity of said rotor for causing said rotor to turn from a first position toward a second position in which the magnetically produced torque would subside; second motor means comprising a second set of stator means cooperating with said permanent magnet rotor and energizable by periodical pulses from the ignition system to assume periodically a predetermined magnetic polarity cooperating with the polarity of said rotor for causing said rotor to turn in synchronism with said pulses; first circuit means connecting said first set of stator means with a source of direct current and including first switch means operable by said drive shaft means depending upon the rotation thereof, between a closed position and an open position in such a manner that said first stator means are energized whenever said rotor is in said first position but de-energized before said rotor reaches said second position whereby said rotor is enabled to continue its rotation due to the moment of inertia of its predetermined mass after said switch means have been moved to open position and to receive a new turning impulse when said switch is again moved to closed position; second circuit means connecting said second set of stator means with the ignition system of the engine for applying the ignition pulses to said second set of stator means, said second circuit means including second switch means controlled by said indicator means for disconnecting said second set of stator means from the ignition system as long as said indicator shaft means is substantially in said zero position to eliminate application of said pulses from the ignition system during the starting period of the engine, third switch means controlled by said indicator means and connected between said first and second circuit means for temporarily connecting said second set of stator means with said source of direct current to establish a stationary magnetic field causing said rotor to assume a predetermined starting position in which said first switch means is in closed position, whereby said first set of stator means is energized; means for returning said second switch means, after said indicator shaft means has been turned to one of its indicating positions substantially different from its zero position, to a position in which said second set of stator means is connected with the ignition system for causing said rotor to rotate in synchronism with the ignition pulses; and disconnecting means for disconnecting said first set of stator means from said source of direct current substantially simultaneously with the returning of said second switch means to said position in which said rotor is caused to rotate in synchronism with the ignition impulses.

6. A speed indicator as claimed in claim 5, including fourth switch means in circuit with said disconnecting means and control means mounted on said indicator means for controlling said fourth switch means depending upon selected indicating positions of said indicator shaft means in such a manner that at a predetermined upper speed limit said disconnecting means is actuated to disconnect said first set of stator means from said source, and that at a predetermined lower speed limit said disconnecting means is caused to reestablish said connection so that at speeds between said speed limits said rotor is rotated only by said ignition impulses.

References Cited in the file of this patent

UNITED STATES PATENTS

| | | |
|---|---|---|
| 1,778,605 | Place | Oct. 14, 1930 |
| 2,649,559 | Wargo | Aug. 18, 1953 |
| 2,927,474 | Peras | Mar. 8, 1960 |
| 2,931,949 | Reinsch | Apr. 5, 1960 |
| 2,950,420 | Hastings et al. | Aug. 23, 1960 |